United States Patent [19]

Kirla

[11] Patent Number: 5,197,630
[45] Date of Patent: Mar. 30, 1993

[54] DISPENSER FOR NESTED CONICAL ARTICLES

[76] Inventor: Stanley J. Kirla, 81 River Rd., Deep River, Conn. 06417

[21] Appl. No.: 797,046

[22] Filed: Nov. 25, 1991

[51] Int. Cl.⁵ .............................................. B65H 3/00
[52] U.S. Cl. ...................................... 221/37; 221/210
[58] Field of Search ................ 221/37, 210, 213, 259, 221/303, 305, 36

[56] References Cited

U.S. PATENT DOCUMENTS

| | | | |
|---|---|---|---|
| 2,765,906 | 10/1956 | Rossum | 221/305 |
| 3,276,622 | 10/1966 | Krzyzanowski | 221/37 |
| 3,599,830 | 8/1971 | Gilchrist et al. | 221/305 |
| 4,121,726 | 10/1978 | Pemberton | 221/37 |
| 4,214,673 | 6/1980 | Heath et al. | 221/259 |
| 4,269,324 | 5/1981 | Hausam | 221/36 |
| 4,339,057 | 7/1982 | Winters | 221/213 |
| 4,629,092 | 12/1986 | English | 221/247 |
| 4,676,396 | 6/1987 | Mamolou | 221/36 |
| 4,739,902 | 4/1988 | Joslyn et al. | 211/210 |
| 4,796,779 | 6/1989 | Mamolou | 221/36 |
| 4,805,801 | 2/1989 | Knopf | 221/210 |
| 4,905,870 | 3/1990 | Mamolou | 221/36 |
| 4,971,222 | 11/1990 | Rohde et al. | 221/210 |

OTHER PUBLICATIONS

Photocopy of Container of Tops MFG Co. "Coffee Filter Dispenser by Tops" (1989).

*Primary Examiner*—Robert P. Olszewski
*Assistant Examiner*—Kenneth Noland
*Attorney, Agent, or Firm*—C. G. Nessler

[57] ABSTRACT

A dispenser for truncated conical coffee filters and the like has a cover with a nominal circular and offset opening. A hinged lid has an oppositely hinged tab which is manually pushed into the container interior, so the tabs abrasive tipped free end engages a filter. Lifting of the lid causes the tab to draw a single filter from the nest, through the opening. When the lid is thereafter lowered, the tab is automatically repositioned in a cutout opening of the lid, sealing the container, when the tab engages a tang projecting into the opening.

14 Claims, 3 Drawing Sheets

DISPENSER FOR NESTED CONICAL ARTICLES

TECHNICAL FIELD

The present invention relates to dispensers for thin sheet like articles, in particular to a device for dispensing, one by one, nested conical paper articles.

BACKGROUND

The invention is particularly useful for dispensing single units of conical paper articles such as filter papers shaped for use in funnels. Common filter paper is typically a cellulose product which is permeable to water and gases, to enable separation of solids from a fluid stream. For low volume intermittent liquid-solid separations, a typical filtering method involves inserting a cone of filter paper into a funnel and pouring the liquid through the funnel.

Conical filters are widely used in industrial laboratories, and so forth to effect or maintain separations. They are also used widely domestically to make coffee drink, and the present invention is particularly suited to the needs attending such use. Such filters come in different configurations, but most popularly they are provided in the form of pleated, truncated circular cones of about 5 inch diameter by 2-3 inch depth. The filter paper thickness is in the range of 0.004 inch. The conical filters are typically sold in quantities of 50-100, nested together, in a loose plastic bag or simple hinged cover box with base or open end upward.

For many people, especially the elderly, it is difficult to readily separate only one of the thin filters from the nested bulk; often several filters will be inadvertently picked off. If several are used in the coffee-making funnel, there is both more waste and a lower flow rate—and possible liquid overflow, than there ought to be.

Suppliers of filters have recognized the separation problem. Some have provided low cost plastic tweezers, with and without rubber tips, in the filter package. The intent appears that the tweezers be used to grasp the innermost of the nested filters at the truncated end, or closed end, of the cone. Nonetheless, a certain dexterity and skill is still required to obtain just one filter.

U.S. Pat. No. 4,214,673 to Heath et al. shows a filter dispenser having a lid with a slidable arm extending into the concavity of nested filters contained therein. When actuated against a spring, the adhesive tipped arm engages the interior of a filter. Lifting the hinged lid causes a filter to be dragged upward. U.S. Pat. No. 4,629,029 to English shows a like construction where the tip is surfaced with abrasive. U.S. Pat. No. 4,121,726 to Pemberton shows a device that is somewhat similar, having a mechanically pivoted lever with a sharp pointed tip to engage the filters; stops around the side walls retain the filter nest in the container. The foregoing devices are comparatively costly to make, in the context of the low cost of filters, and are not suitably made of low cost materials such as cardboard.

U.S. Pat No. 4,739,902 of Joslyn et al. shows a coffee filter dispenser with several features in common with the present invention; it is made of cardboard and has a hinged lid which is die cut from the top cover. A tab, diecut into the hinged lid, hinges from the outer portion of the lid. The tab is surfaced with adhesive and adheres to a filter, as in the other patented devices, when the tab is pushed into the interior of the filter nest contained in the dispenser. When the lid is raised, a filter is pulled out; remainder portions of the top cover act as stops, to retain the filter nest as the topmost filter is drawn out.

However, all the filter dispensers which use adhesive suffer the disadvantage that there is an accumulation of filter debris over time, lessening their effectiveness. Further, unlike the slidable lever devices, the container of Joslyn tends to not automatically provide a closed container which protects the contents from debris, since after several times of use, the tab tends to sag and remain depressed within the box.

Thus, there is a need for a better system by which a user can separate a filter from a bulk mass of filters. The dispenser will have a low cost, consistent with the price of the filter papers. Ideally, the device will also be amenable to being either the container in which the filter papers are sold, or to being collapsible and economically shipped for separate mail order sale.

DISCLOSURE OF THE INVENTION

An object of the invention is to provide a simple, low cost and effective dispenser for the conical articles of a nested mass, especially when the articles are truncated cone coffee filters. A further object is to provide a dispenser which has a simplicity in construction with the minimum number of parts. A still further object is to provide a dispenser which automatically closes to exclude debris entry when filters are not being dispensed.

According to the invention a container for dispensing nested conical articles, such as coffee filters, has a cover with an opening which is offset. The opening lies above the concavity of the nest of articles within the dispenser. A lid, pivotably attached so it may lie across the cover and opening, has attached to it a pivotable tab which can be rotated through the opening when the lid is made to lie across the cover. The free end of the tab has means for engaging the uppermost article of the nest, and raising the lid and attached tab causes the article to be drawn through the opening and thereby dispensed. The preferred generally circular and offset opening better retains the filter nest within the container than heretofore.

Also in accordance with the invention, there is a tab-tang combination which provides automatic repositioning of the tab within its opening in the lid. The container is as just described, except that the opening may or may not be offset and approximately circular. A tang projects into the opening from the one side where the lid is pivoted. Thus, the free end of the tab overlies the tang when the lid lies across the opening. When the tab is pushed into the container opening, to engage an article, there is elastic deformation of the tab-tang combination and the resistive action of the tang is overcome. After the lid has been raised and an article has been dispensed, the lid is pivoted back across the cover. Now, the tab engages the tang and is thereby pushed into position within the tab opening in the lid. Thus the lid will keep debris from entering.

Preferably, the tab free end is surfaced with an abrasive and the tab is hinged from the outer edge of the lid, opposite the side where it pivots, to overcome the limitations of adhesives of the prior art.

The invention improves the manual mechanical actions which the user of a dispenser exerts, thereby making it easier and more effective in use. The invention provides a low cost way of shipping, protecting and storing coffee filters in particular, yet still providing a simply used way of dispensing them one at a time. It is amenable to low cost mass production. Other features and advantages of the invention will become apparent in light of the following description.

BEST MODE FOR CARRYING OUT THE INVENTION

The preferred embodiment of the invention is described in terms of a rectanguloid container for holding pleated truncated-cone paper filters such as are used for domestic coffee making. The container is made from 0.040 inch cardboard. It will be evident that the principles of the essential invention will also be applicable to other nested paper shapes, to other means for containing the articles, and to containers made of other material.

Figure 1:
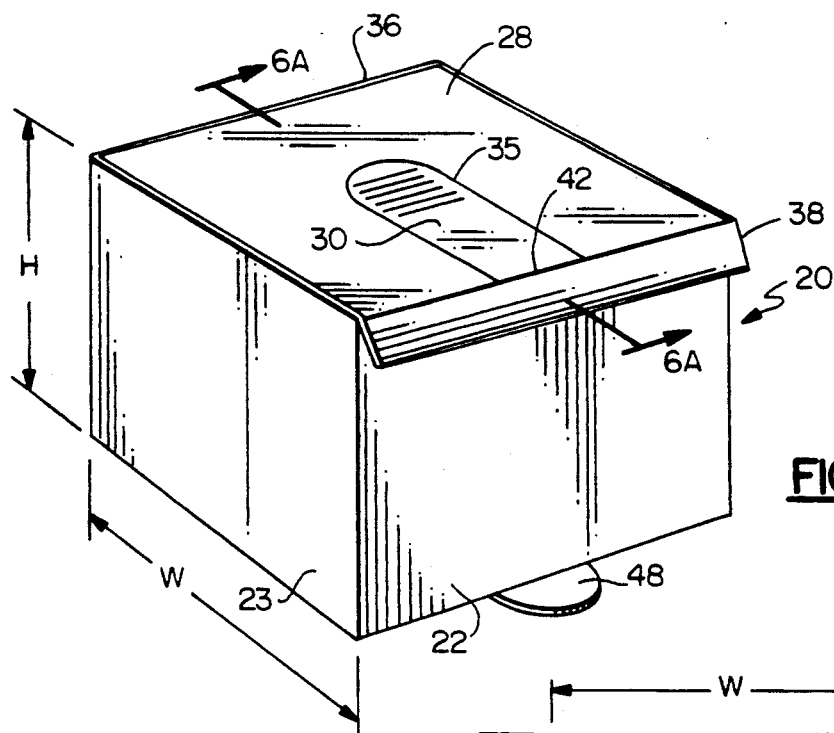
FIG. 1 shows the dispenser with the lid closed and tab in the stored position.
Figure 6A:
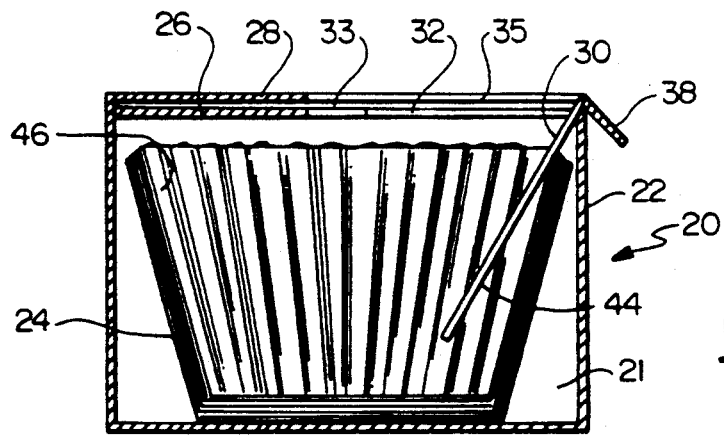
FIG. 6A shows in side cross section view a dispenser holding a nested group of conical filters, with the lid closed.

FIG. 1 shows a dispenser comprised of a square cross section container 20 having a height H and typical sides 23 of width W. The dispenser is made of pressed and glued cardboard. As shown in the cross section of FIG. 6A, there is an interior space 21 with a rectangular vertical cross section into which nested filters may fit. The nest 24 shown in FIG. 6A is loosely contained by the sides and the height H is somewhat greater than the starting height of the nest. For example, if the nest is about 3 inch high, then the height H will be about 3.5 inch; if the nest is originally about 5 inch OD, the width W will be about 5.3 inch.

The container has a top end across which lie both a cover 26 and a surmounting lid 28 (shown in its closed position in FIG. 1 and FIG. 6A). See also FIG. 2. The cover 26 has a loosely circular opening 32, the center of which is offset toward one side 22 of the container. The circle opening is extended through tangent lines 34 to the edge of the cover where it meets the top edge 40 of the side 22. The opening is described below in more detail in connection with FIG. 12. Projecting into the cover opening is a tang 33.

The lid is pivoted at a line 36 where the cover meets the back side of the container, which opposes side 22. The pivot at line 36 is an integral hinge, or simply a crease in the cardboard. A flap 38 is attached along the front edge 40 of the lid, to better close the opening 32 when the lid lies across it and to provide structure for the mounting of the tab which is described next.

The cantilevered oblong tab 30 is hinged at the lid edge free end 42, pivoting oppositely the lid hinge, preferably by a crease in the lid material. It fits with light friction in a die cut portion 35 of the lid when it lies parallel to lid. When the tab is pushed downwardly while the id is in the closed position, the tab extends through the offset opening 32, and into the interior space 21. See FIG. 6A. The tab is sufficiently long to contact the filters in the interior. When the box and filter dimensions are as described above, a suitable tab length will be about 2.8 inch. The tab and offset opening in the cover are sized with respect to the anticipated filter nest mass, so that the tab can fit through the offset opening and engage the concave side wall of the uppermost filter of the nest without hitting the truncated conical end (bottom) of the uppermost filter in the the nest.

Figure 3:
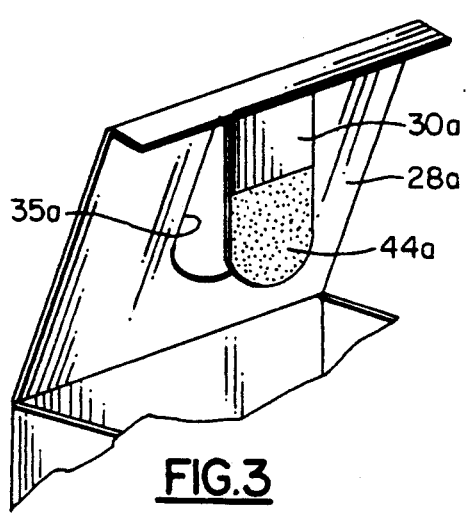
FIG. 3 shows an abrasive surface on the underside of a tab.
Figure 4:
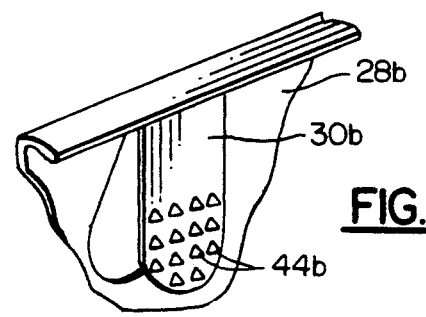
FIG. 4 shows a tab with a molded in textured surface for gripping a filter.

The tab has an underside surface 44 which has a structure capable of frictionally gripping the filter substance when slid across it. A preferred way of obtaining the desired character on cardboard is to adhere a mass of abrasive particles, such as the piece of 100 grit sandpaper 44a shown on tab 30a of the lid 28a in FIG. 3. If the dispenser lid 28b or tab 30b are made of molded plastic, molded teeth 44b shown in FIG. 4 may be used. Alternately, releasable adhesives and elastomers may be applied to an ordinary cardboard or plastic surface, though experiments thus far show the mechanical abrasive surface means are more preferred. The tab also has a frictionally enhancing structure on the upperside surface, opposing the surface 44, so that a person's finger actuating it will not readily slide. Most preferably, this is a textured (rippled) surface for cost reasons, but some of the same substances as are used on the underside may be employed.

Figure 6B:
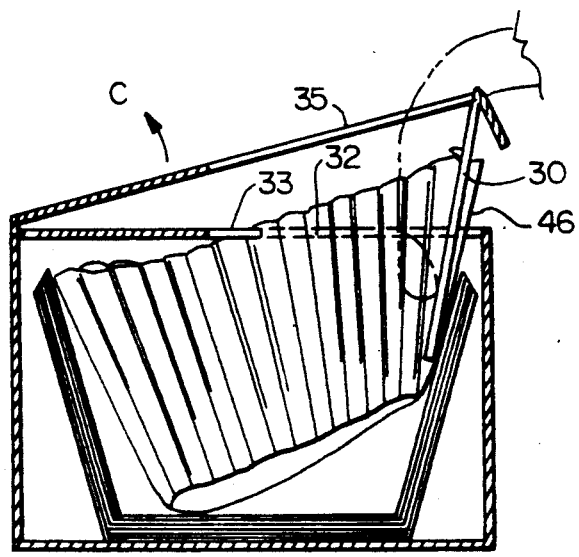
FIG. 6B is like FIG. 6A, and shows how a person's finger has depressed the tab to engage a filter, and by raising the lid and tab, starts to draw a filter from the dispenser.
Figure 6C:
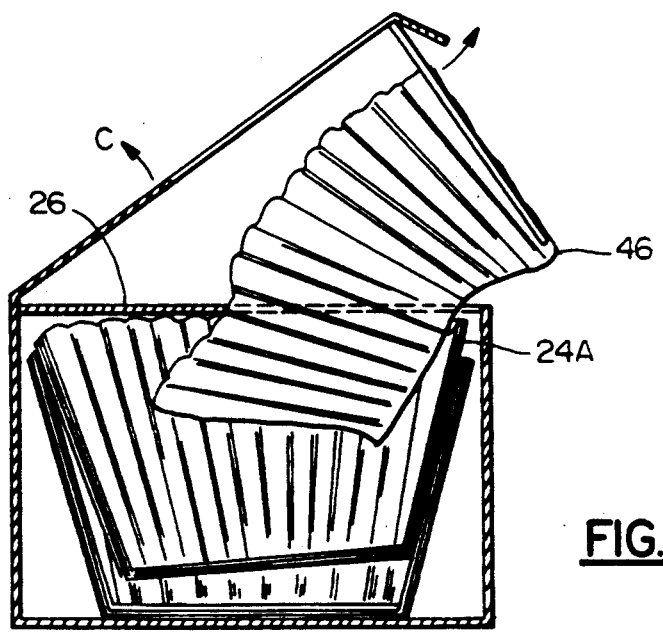
FIG. 6C is like FIG. 6B, and shows the lid and tab further raised, to withdraw the filter, while the remainder of the filter nest is restrained by the cover.

FIG. 6A, 6B and 6C show sequentially how the parts of the dispenser work to dispense one filter at a time. In FIG. 6A, a user's finger (not shown) pushes the tab 30 into the interior space 21, reaching through the openings 35, 32, to the point where the gripping surface 44 contacts the concavity of the inner- or upper-most filter 46 of the nest 24. The contacting motion is resisted as the nest presses against the front side 22. In FIG. 6B, the the finger (shown in phantom) and the tab are moved vertically while the rotational, or horizontal, force is maintained. The lid pivots upwardly (shown by the arrow C) and the tab rotates in relatively small degree with respect to the lid. By engagement with the surface 44, the filter 46 is thus drawn upward and through the cover opening 32. In FIG. 6C, the filter 46 is shown almost fully out of the opening 32; it is now sufficiently separated to be conveniently grasped manually and taken away from the dispenser. Part or all of the nest tends to be drawn up with the filter 46. FIG. 6C shows part 24A of the nest being drawn up with the filter 46, toward the top of the container. But the cover 26 engages the part 24A, and the motion of the tab is thus able to readily separate the one filter 46 from the nest.

It will be appreciated from the foregoing that the rotary motion that is applied to the tab, and the lifting motion that the finger applies to the tab (and thus to the lid) after it is contacted with the filter paper, are consistent and easy motions, as compared to a combination of sliding and rotating, or the use of separate tweezers, as required by articles in the prior art. To achieve this ready result it is important that the pivot point 42 of the tab be near the outer edge of the lid, or proximate the side of the container, as shown in the Figures thus far discussed.

The combination of tang 33 and tab 30 are sized so that the free end of the tab hits the tang as it is pushed into the container. Being made of cardboard, the combination is sufficiently flexible and elastic that the tab is able to pass by the tang without damage to either. Typically, after some use the tab will cease to resiliently spring back to a position parallel with the lid, but will tend to remain partially pivoted. Nonetheless, as the lid is lowered back across the cover and opening, the sagging tab will hit the tang and be pushed back into the die cut opening. In such way the cover will be closed and debris, etc., will not be able to enter the container.

Various emodiments and options may be employed in the invention, especially when very low cost is not paramount. As described, the tab and lid are preferably pivoted at integral hinges, i.e., by deformation of the container material. Alternately, conventional hinging may be used.

Figure 5:
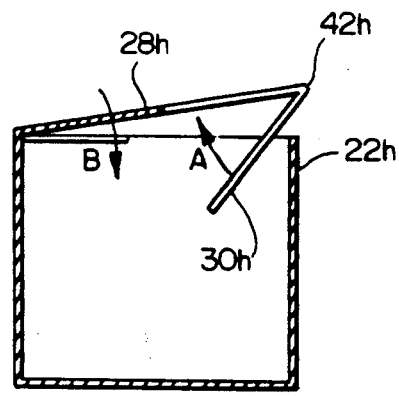
FIG. 5 shows a dispenser where the tab is closed by contact with a side of the container.

When the tab is integrally hinged, i.e., cantilevered, as described above, and the container is made of cardboard or molded plastic, there will be natural tendency, at least when the container is new, for the tab to return to its rest position parallel with the surface of the id. When such action tends to be insufficient, or where the pivoting is not by elasticity of the material, other means for biasing may be used. The tang has been described. In another embodiment a biasing leaf spring may be used. In another embodiment, shown in FIG. 5, tab 30h is pivoted from the edge 42h of a lid 28h which extends beyond the side 22h. When the lid is closed as indicated by arrow B, the top of the side 22h hits the tab and causes it to close, as indicated by arrow A.

Figure 7:
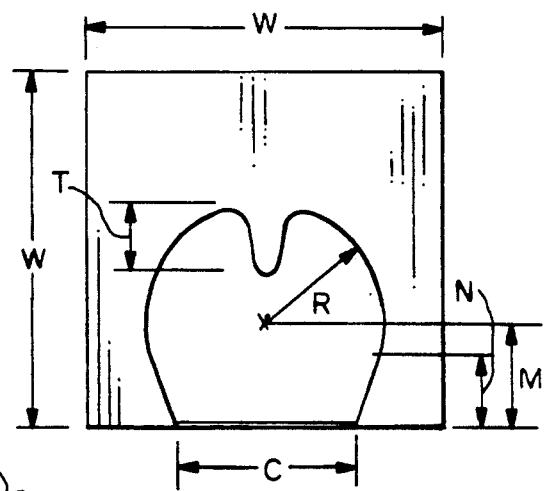
FIG. 7 shows the dimensions of a preferred nominal circular opening and tang.

FIG. 7 shows the inch dimensions of the lid opening of the preferred embodiment container. The circle part of the opening has a diameter of about 3.5 inch, or about two thirds of the 5.25 inch dimension of side W of the square top. Referring back to the sequence of FIG. 6, and referring just below to FIG. 8 which shows a prior art rectangular opening, the advantage of the offset circle opening can be appreciated as several fold. There is better retention of the filter nest since it has better engagement with the circumferential retention surface, especially when there are relatively few filters remaining in the nest. The container also has more structural integrity since there is better connection of the back portions of the container.

Figure 8:
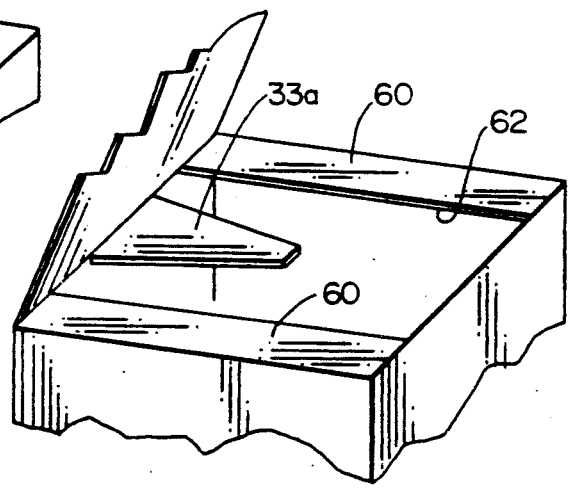
FIG. 8 shows a tang in a rectangular opening of the prior art.

Another advantage is that, with the circumferential opening, the dispenser is able to contain and dispense filters which have lesser diameters than those which have been described. In handling a range of filter diameters, it is thus more versatile than prior art dispensers which have other manner of cover openings. FIG. 7 also shows how the tang projects about three quarters to one inch into the opening. A preferred tab associated with the tang shown will extend about 2.5-3 inches from the front edge, so that the tab and tang overlap will be about one half inch. Of course, the tab-tang combination effecting automatic lid closure can also be used with with the style opening shown in the prior art, namely an oblong hole 62 formed by a cover which is essentially two parallel rails 60, as shown in FIG. 8. Tang 33a projects into the opening.

Figure 9:
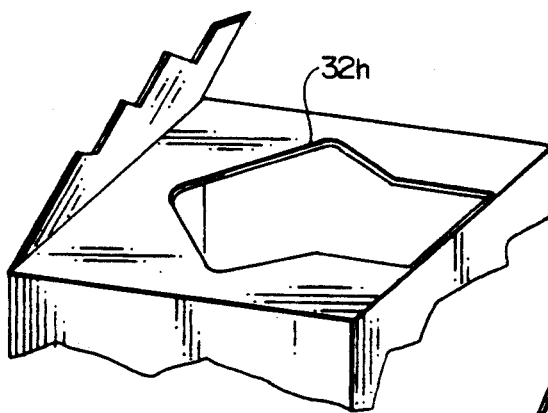
FIG. 9 shows an nominal circular opening which approximates a diamond shape.

The opening of the invention has been referred to as nominally or approximately circular. Within the invention, it can tend toward being heart shape. It can tend toward being diamond shaped as shown as is the opening 32h of FIG. 9.

Figure 2:
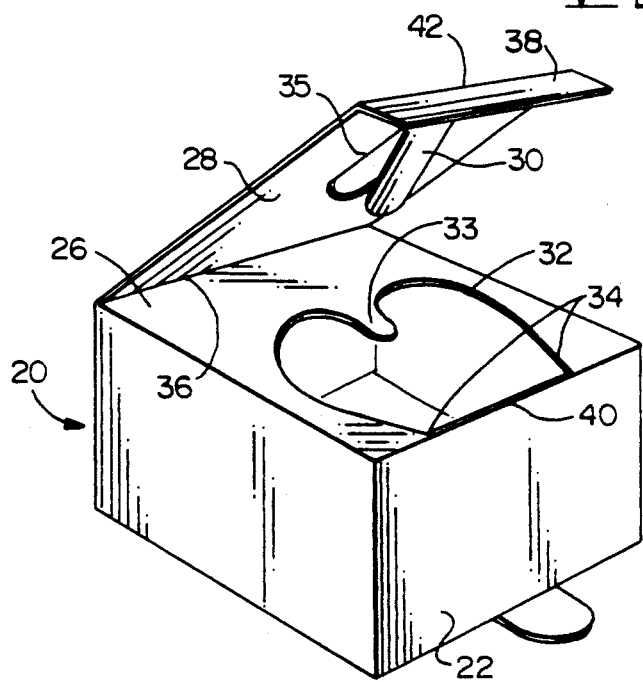
FIG. 2 shows the dispenser with the lid open, revealing the offset opening and tang.

Referring to FIG. 1 and 2, the container may have a hold-down tab 48 at its bottom for convenience in preventing it from lifting during use. Other like features, including a widened or flanged container, may be employed for holding down or mounting the container on a mounting surface. It will also be apparent that the device can be used in virtually any orientation and that bottom and top as used herein are arbitrary designations which should not be taken as limitations.

The container may have various shapes. It may be cylindrical, in which case the lid and cover would have generally circular shapes. The invention may be utilized where there is no closed container as such. That is, in the generality of the invention, there need only be means to fix the filter nest and the above described functional parts in spatial relationship, and means to restrain the lateral motion of the filters against action of the tab. Such combined functional means should be considered to be within the scope of "container" as it is described and claimed here.

The dispenser may be made of cardboard or other paper substances, as described. Such a dispenser would be suitable for containing the filters at retail display and a one-time use. The dispenser is also adaptable to being foldable; the container may be folded flat for convenient shipment and then assembled. Alternately, the dispenser may be made of molded plastic or metal, to suit long term use and continual refilling of the filter content.

The invention will be applicable to the dispensing of other products presenting a similar problem to the coffee filters described herein to exemplify use of the invention. It will be usable for nested objects that are cone shaped, cup shaped and even more complex shapes. It also may be used to dispense other articles coming in thin sheet material bunches.

Although only the preferred embodiment has been described along with some alternatives, it will be understood that further change in form and detail may be made without departing from the spirit and scope of the claimed invention.

I claim:
1. A device for dispensing nested conical articles comprising a container for holding nested conical articles in an interior space thereof with concave article ends facing the container top;

a cover attached to the top of the container, having an opening through which filters can be drawn;

a tang attached to the cover, projecting into the cover opening toward the center of the opening;

a lid, pivotably attached to the top of the container at the same side from which the tang projects, adapted to pivotably lie across the cover opening; and a tab, having a free end with conical article gripping means, pivotably attached to the lid free end, fitting within a tab opening in the lid when parallel thereto, pivoting oppositely to the lid pivot, the tab free end manually pivotable through the cover opening and into the interior space when the lid lies across the cover opening to engage by its free end the uppermost nested conical article within the container, the tab having a length sufficient to engage the tang;

the tab and tang in combination being elastically deflectable so that when the lid lies on the cover the tang urges the tab into the tab opening in the lid until or unless the tab is manually forced past the tang to cause the tab free end to engage a nested conical article, whereafter lifting of the lid causes an article to be dispensed through the opening.

2. The device of claim 1 characterized by the cover opening being offset toward the cover side opposite the tang.

3. The device of claim 1 characterized by a tab having a free end gripping means which is an abrasive.

4. The device of claim 1 characterized by a one piece lid and tab wherein the tab pivots by elastic deformation of the material of said one piece.

5. The device of claim 1 characterized by holding means attached to the container bottom, for restraining the container to a mounting surface when the lid is lifted.

6. A device for dispensing nested conical articles comprising
- a container for holding nested conical articles in an interior space thereof with concave article ends facing the container top;
- a cover attached to the top of the container, having a nominally circular opening through which filters can be drawn, the opening offset from one side of the container;
- a lid, pivotably attached to the top of the container at said container one side, the lid having a free end lying across the cover opening; and
- a tab, having a free end with conical article gripping means, pivotably attached to the lid free end opposite the point of pivotable attachment, the tab pivoting oppositely to the lid pivot, for manual pivoting into the interior space through the offset cover opening when the lid lies across the cover opening, to engage by its tab free end the uppermost article of the nested conical articles within the interior space of the container, whereafter lifting of the lid and attached tab pulls an article to and partially through the opening, the cover surrounding the offset opening engaging the remainder of the nested conical articles and restraining them within the interior space.

7. The device of claim 6 characterized by a tab having a free end gripping means which is an abrasive.

8. The device of claim 6 characterized by a one piece lid and tab wherein the tab pivots by elastic deformation of the material of said one piece.

9. The device of claim 6 characterized by means for biasing the tab to a position parallel with the surface of the lid.

10. The device of claim 9 characterized by biasing means which comprises mechanical engagement of the tab with a part of the top of the container.

11. The device of claim 6 characterized by an opening that has a diameter of about two thirds of the transverse dimension of the container top.

12. The device of claim 6 characterized by holding means attached to the bottom of the container, for restraining the container bottom to a mounting surface when the lid is lifted.

13. The device of claim 12 characterized by holding means which is a tab extending from the side at the base bottom.

14. A device for dispensing nested conical filters comprising a container for holding nested conical filters in an interior space thereof with concave filter ends facing the container top;
- a cover attached to the top of the container, having an opening through which filters can be drawn, the opening offset toward one side of the container;
- a tang attached to the cover at a side proximate said one side of the container, projecting into the cover opening toward the center of the opening;
- a lid, pivotably attached to the top of the container at the same side from which the tang projects, having a free end which pivotably lies across the cover opening; and
- a tab, having a free end with conical article gripping means, pivotably attached to the lid free end, fitting within a tab opening in the lid when parallel thereto, pivoting oppositely to the lid pivot, the tab free end manually pivotable through the cover opening and into the interior space when the lid lies across the cover opening to engage by its free end the uppermost nested conical article within the container, whereafter lifting of the lid and attached tab pull an article from the nest through the opening; the tab having a length sufficient to engage the tang; and, the tab and tang in combination being elastically deflectable so that when the lid lies across the cover the tang causes the tab to be within the opening of the lid until or unless the tab is forced past the tang to engage a nested conical filter.

* * * * *